United States Patent [19]

Olson et al.

[11] Patent Number: 4,847,758
[45] Date of Patent: Jul. 11, 1989

[54] MAIN MEMORY ACCESS IN A MICROPROCESSOR SYSTEM WITH A CACHE MEMORY

[75] Inventors: Anthony M. Olson, Stevensville; Thomas N. Robinson; Babu Rajaram, both of St. Joseph, all of Mich.

[73] Assignee: Zenith Electronics Corporation, Glenview, Ill.

[21] Appl. No.: 115,278

[22] Filed: Oct. 30, 1987

[51] Int. Cl.[4] .............................................. G06F 12/08
[52] U.S. Cl. .............................. 364/200; 365/189.05; 365/203; 365/238.5; 364/243.4
[58] Field of Search ...................... 364/200, 300, 900; 365/189, 203

[56] References Cited
U.S. PATENT DOCUMENTS

4,138,740 2/1979 Itoh ....................................... 365/203
4,567,578 1/1986 Cohen et al. ......................... 365/189

Primary Examiner—Raulfe B. Zache

[57] ABSTRACT

A data processing system includes a high speed buffer, or cache, memory for temporarily storing recently executed instructions and a slower main memory in which is stored the system's operating program. Rather than sequentially accessing the cache memory to determine if the next instruction is stored therein and then accessing the main memory if the cache memory does not have the next instruction, system operating speed is increased by simultaneously accessing the cache and main memories. By accessing the main memory during its row address strobe (RAS) precharge time while simultaneously accessing the cache memory, the time necessary for the system's processor unit (PU) to read the next instruction from the main memory when not stored in the cache memory is substantially reduced.

10 Claims, 3 Drawing Sheets

MAIN MEMORY ACCESS IN A MICROPROCESSOR SYSTEM WITH A CACHE MEMORY

CROSS REFERENCE TO RELATED APPLICATION

This application is related to, but in no way dependent upon the following application which is assigned to the assignee of the present application: Ser. No. 071,118, filed July 8, 1987, entitled "Combined Paged Main Memory and Cache Memory System," in the name of Anthony M. Olson.

BACKGROUND OF THE INVENTION

This invention relates generally to data processing systems having a main memory and a high speed cache memory and is particularly directed to increasing the operating speed of a data processing system having main and cache memories by reducing the time required for main memory access when the required instruction is not in the cache memory.

A cache memory is an expensive, very high speed buffer memory which holds a copy of the most commonly (with respect to time) accessed program and data elements from a main memory in the data processing system. The cache memory provides a buffer storage for the portion of the main memory that is currently being used. It also contains a translation of the main memory address into this buffer storage. For this reason, cache memories are said to have "temporal" locality. This is a primary benefit of cache memories since previous data processing system studies have shown that operating programs generally exhibit a great deal of temporal locality. An example of a commonly used program data structure with temporal locality is a loop. Because of the temporal locality manner in which cache memories are used, a small amount of cache memory, relative to the size of the main memory, can be used to dramatically reduce the average access time from the data processing system's central processor unit (CPU) to the main memory while only slightly impacting system cost.

When the desired data is not found in the cache memory, the CPU must then access the main memory to retrieve the required data and store this current data within the cache memory as an update to maintain the desired temporal locality. This operation requires accessing the main memory which typically operates at a slow characteristic speed. For example, while the CPU may be capable of accessing the cache memory in 35-70 nanoseconds, dynamic RAM access times are generally 70-120 nanoseconds. This problem is particularly evident at such critical operating times as power-up when the cache memory is "empty" or when it is necessary to switch from one task to another during operation of the data processing system. At such critical times, the contents of the cache memory is not relevant to the current program accesses and thus it is possible that a large number of slow main memory accesses will be necessary until the cache memory is sufficiently updated. Since the cache memory must operate at the slower main memory speeds during these updates, its high speed effectiveness is essentially lost during these periods.

One prior art attempt to solve this problem which has been used in mainframe computers is to increase the block size of the cache memory. The block size is the number of bytes actually read into the cache memory during the update process. Since this update of the cache memory is generally longer than the current access requirement, the cache memory will be updated with bytes which most likely will be accessed in the near future due to the operating characteristic of spatial locality exhibited by most computer programs. This characteristic relates to the tendency to execute instructions which are stored in physically or spatially close together addresses as is the case in most main memories. However, this approach has some fundamental limitations. For example, as the block size increases the size of the bus between the cache memory and the main memory must proportionately increase if the update is to occur in a single main memory access. This limitation is primarily in the physical space required by additional buses as well as in the increased system cost for the buses, buffers and additional control logic. Another fundamental limitation of this approach, which is referred to as "fragmentation", relates to attempts to continue to increase the data block size for an increased cache memory update in that spatial locality will increase performance of the cache memory only up to a point. After that point is reached, additional increases in the block size will actually result in a decrease in cache memory performance because unneeded code will be read and stored in the cache memory during an update. This unneeded code update will displace code already residing within the cache memory which will be needed for an access in the near future.

A problem is encountered when the desired data is not found in the cache memory, necessitating accessing of the main memory. In past designs, this delayed access to the main memory has placed a limitation on system operating speed because the cache memory must first be accessed followed by a determination that the required data or instructions are not in the cache before the main memory is accessed. Thus, cache memory misses actually result in an access time of greater duration than if only the main memory had initially been accessed. This "longer" memory access occurs only when the required data or instructions is not in the cache memory which is on the order of 10% to 30% of all memory accesses. Thus, in prior art memory accessing schemes, although the use of a cache memory reduces the average time for memory access, actual access to the slower main memory has been relatively slow and certainly less than optimal.

The present invention addresses and overcomes the aforementioned limitations of the prior art by simultaneously accessing the cache and main memories during a memory read cycle. Cache memory and main memory dynamic RAM access times are matched in such a way that very fast cache memory accesses occur during the time that the dynamic RAM would be unable to start an access, e.g., during its precharge time. Memory access time is thus more optimally employed, since cache memory accesses occur more transparently relative to the main memory.

OBJECTS OF THE INVENTION

Accordingly, it is an object of the present invention to increase the operating speed, or throughput, of a data processing system.

It is another object of the present invention to increase the operating speed of a data processing system having a high speed temporary cache memory and a slower main memory by simultaneously accessing both memories during a read cycle.

Yet another object of the present invention is to minimize the time required to access the main memory in a data processing system once it is determined that the desired instruction is not stored in the system's high speed cache memory.

Still another object of the present invention is to increase data processing system operating speed by matching cache memory access times and main memory dynamic RAM access times in such a way that very fast cache accesses occur during the time that the dynamic RAM would be unable to start an access, e.g., during its precharge time, etc.

SUMMARY OF THE INVENTION

The present invention contemplates a data processing system having a processing unit for reading and processing desired data either from a fast cache memory wherein first data most frequently processed by said processing unit is stored or from a slower main memory wherein second data less frequently processed by the processing unit than the first data is stored, and wherein either the cache memory or the main memory is accessed by the processing unit during a plurality of successive system operating cycles, a method of accessing the main memory comprising: initiating access of the main memory by asserting a precharging signal to the main memory over a predetermined time interval in preparation for accessing the main memory; accessing the cache memory during the predetermined time interval; and accessing the main memory following the predetermined time interval when the cache memory does not have the desired data and reading the desired data from the main memory.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

FIGS. 2a-2l illustrate the timing of various signals within the microprocessor system with improved main memory access illustrated in FIG. 1;

DETAILED DESCRIPTION OF THE PREFERRED EMBODIMENT

Figure 1:
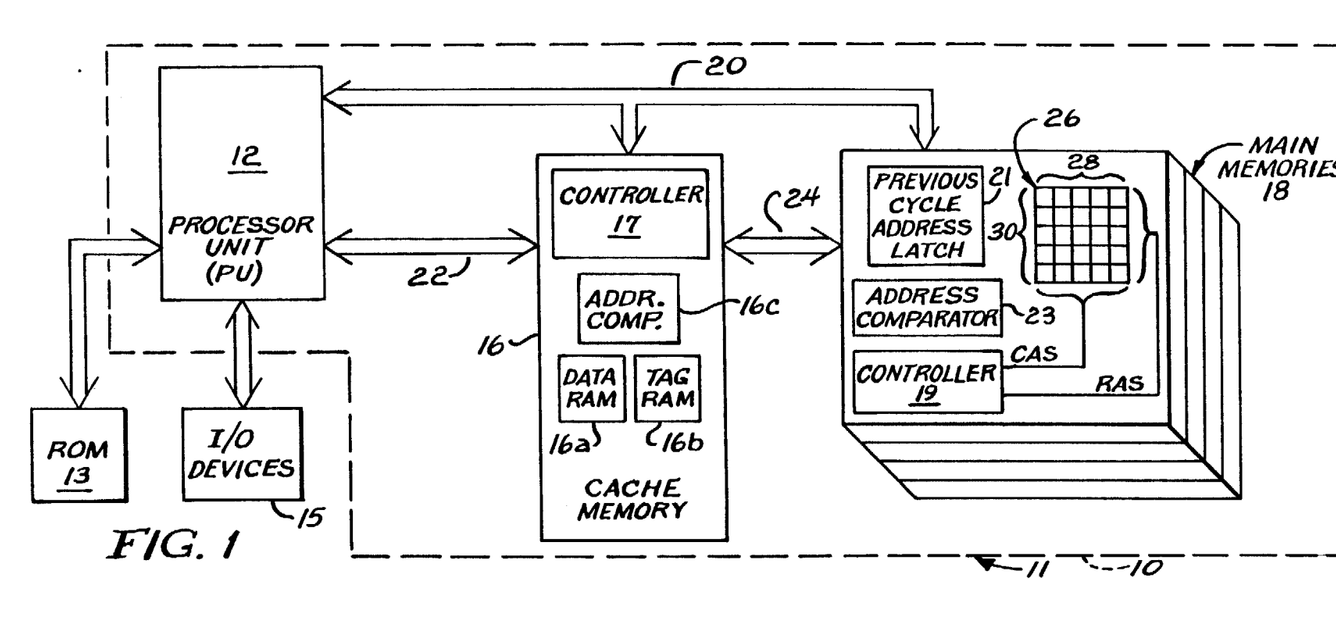
FIG. 1 is a simplified block diagram of a microprocessor system having a main memory and a cache memory in which main memory access time is reduced in accordance with the principles of the present invention.

Referring to FIG. 1, there is shown a simplified block diagram of an improved main memory access system 10 for use in a data processing system 11 in accordance with the principles of the present invention.

The improved main memory access system 10 includes a processor unit (PU) 12 coupled to a cache memory 16 as well as to a main memory 18 via a bi-directional address/data bus 20. The PU 12 is further coupled to the cache memory 16 by means of a bi-directional control bus 22. The cache memory 16 is also coupled to the main memory 18 via a bi-directional system control bus 24. Although the present invention is described herein as including a single main memory 18, it is capable of operating equally as well with a plurality of main memories as shown in FIG. 1, and thus this portion of the system is hereinafter referred to in the plural as main memories.

In general, the PU 12 reads programs (software instructions) and data (operands) from the cache memory 16 and processes these instructions and data in controlling the operation of the data processing system 11 which includes the improved main memory access system 10 of the present invention. The data processing system 11 may include other elements such as a read only memory (ROM) 13 and various input/output devices 15 coupled to the PU 12 for carrying out specific functions. The cache memory 16 is a high speed memory device such as a static random access memory (RAM) which is updated by instructions and data stored within the main memories 18, which typically are dynamic random access memories. Because of its characteristic high operating speed and associated high cost, the cache memory 16 is typically smaller in data storage capacity than the main memories 18. Ideally all instructions and data required by the PU 12 will be stored in the high speed cache memory 16 since the PU is also capable of operating at high speeds. By continually updating the cache memory 16 with most recently used instructions and data from the main memories 18, it is possible, at least in theory, to permit the PU 12 to continuously operate near the characteristic high speed of the cache memory.

As a practical matter, there will be instances when the cache memory 16 will not contain the information needed by the PU 12. At these times it is necessary to provide instructions and data from the main memories 18 to the cache memory 16 at the same time as the PU 12. One example of such an instance is at system power-up. When the necessary data is not in the cache memory 16, the PU 12 must access the main memories 18 via the cache memory 16, with system operation limited to the lower operating speed of the main memory. By allowing the cache memory 16 to access the main memories 18 in a paged manner, cache memory efficiency, i.e., the hit ratio or the percentage of time that the required data is located in the cache memory, is improved allowing the data processing system 11 to operate substantially at the speed of the fast cache memory as disclosed and claimed in the co-pending application assigned to the assignee of the present application and cross-referenced above.

In controlling the operation of the data processing system 11 in which the improved main memory access system 10 of the present invention is employed, the PU 12 generates various operating cycles in selectively accessing the cache memory 16 and the main memories 18 and is responsive to instructions and data received therefrom. The PU 12 is capable of such operations as branching to error operations, processing interrupts originated by various peripherals such as the I/O devices 15 in the data processing system, and performing diagnostic routines and arithmetic/logic operations as well as executing specific application programs.

The PU 12 is capable of writing data into and reading data and instructions from the main memories 18 via the bi-directional address/data bus 20. The PU 12, in response to the instructions and data provided thereto, generates various control signals which are provided via a bi-directional control bus 22 to the cache memory 16. In addition, the PU 12 provides address information to the cache memory 16 via the address/data bus 20 for identifying specific data storage locations within the cache memory which the PU seeks to access. The cache memory 16 and the main memories 18 are coupled via the bi-directional system control bus 24 by means of which control signals are provided from the cache memory to the main memories 18. Data and instructions stored in the main memories 18 are provided to the cache memory 16 for updating the cache memory. Each of the main memories 18 includes a matrix-type memory 26 wherein data and instructions are stored in a plurality of memory locations, each defined by a given column 28 and row 30. The cache memory 16 includes a controller 17 responsive to control signals received from the PU 12 via the control bus 22. The cache memory controller 17 responds to the control signals on the control bus 22 as well as to address and data information on the address/data bus 20 from the PU 12 by providing appropriate signals to a controller 19 within the main memories 18 which, in turn, generates a row address strobe (RAS) signal and a column address strobe (CAS) signal for directly accessing the matrix memory 26 within a main memory. In addition, the cache memory controller 17 processes the address information received from the PU 12 via the address/data bus 20 and provides this address information to the main memories 18 via the address/data bus 20. The main memories also include a previous address latch 21 and an address comparator 23, the operation of which are described in detail below.

The cache memory controller 17 as well as the main memory controller 19 are integral parts of conventional cache and main memories, respectively. As such, the cache memory and main memory controllers 17, 19 are comprised of logic and timing circuitry for processing the control and address signals provided thereto in generating appropriate control signals for the memory within which each controller is respectively located. The configuration and operation of the cache memory controller 17 and the main memory controller 19 as well as the various control signals generated therein and output therefrom are conventional in nature, with the details thereof not forming a part of the present invention, and are therefore not described in greater detail herein.

Figure 2A:
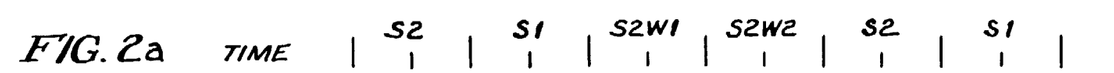
Figures 2B, 2C:
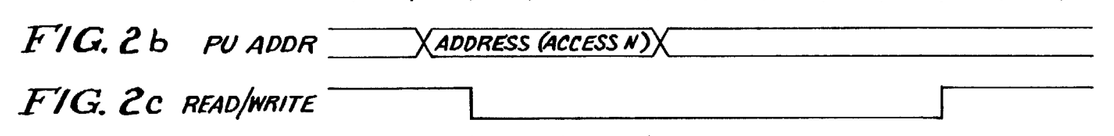

Referring to FIGS. 2a–2l, there are shown various timed operating states of the PU 12 as well as the timing of various signals used in the improved main memory access system 10 of the present invention. All signals depicted in these figures are of the active low type. FIG. 2a illustrates various time intervals in an operating cycle of the system's PU 12, wherein a memory access cycle (either a READ or a WRITE operation) is initiated at the beginning of the S1 operating state and terminates at the end of the S2 operating state, with one or more wait periods, (S2W1, S2W2) provided between cycle start and stop. A PU address (PU ADDR) signal as shown in FIG. 2b is provided by the PU 12 via the address/data bus 20 to the cache memory 16 as well as to the main memories 18. The PU ADDR signal designates that location, or locations, within either the cache memory 16 or the main memories 18 where the data or instructions required by the PU 12 is located. The term "data" as used hereinafter refers to both data and instructions for simplicity. The PU 12 then outputs via the control bus 22 to the cache memory 16 either a READ or a WRITE signal as shown in FIG. 2c. Since the present invention relates to the reading of data by the PU 12, this control signal will hereinafter be referred to as the READ signal.

Figure 2D:
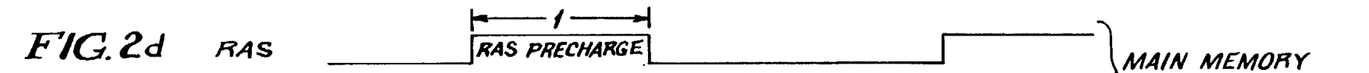

The leading edge of the READ signal initiates a read access cycle of the cache memory 16. The address is processed by the cache memory controller 17 which determines if the required data is in the cache memory 16 by comparing the address information provided by the PU 12 with pointers stored in a tag RAM 16b pointing to locations in a data RAM 16a within the cache memory in which data is stored. This address comparison is performed in a conventional manner by the combination of a previous cycle address stored in the tag RAM 16b within the cache memory 16 and address comparator circuitry 16c. When the cache memory controller 17 determines that the cache memory 16 does not contain the desired data, an appropriate system control signal is provided from the cache memory 16 via the system control bus 24 to the main memories 18. This system control signal is processed by the main memory controller 19 in generating a row address strobe (RAS) signal after a predetermined time delay following the leading edge of the READ signal. The time delay between the leading edges of the READ and RAS signals represented by the number 1 is termed the RAS precharge time. The duration of this time delay is determined by the logic and timing circuitry within the main memory controller 19 and is dictated by various system operating parameters such as the operating speeds of the PU 12 and the main memories 18 as well as the amount of data typically transferred between the PU and the main memories. The RAS signal designates the row 30 within which the required data is located within the matrix memory 26.

Figure 2E:
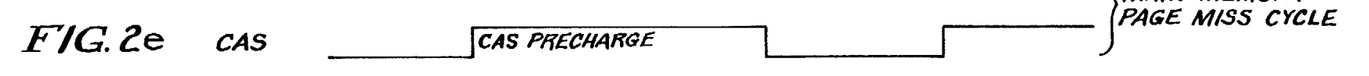

After another predetermined time delay following the leading edge of the RAS signal, the main memory controller 19 provides a column address strobe (CAS) signal to the matrix memory 26 for designating the column 28 in the matrix memory within which the required data is located. This latter time delay is referred to as the CAS to RAS delay time. The generation and relative timing between the RAS and CAS signals illustrated in FIGS. 2d and 2e is for a page miss cycle wherein the required data in the current main memory access cycle is not in the same row as the data read from the main memory by the PU in the preceding access cycle. In this type of main memory access, an inactive to active transition of RAS and CAS signals are both necessary for designating the data storage location in the main memory in which the required data is.

When the required data is not in the cache memory 16 and the cache memory must thus be updated with data from the main memories 18, the main memory's matrix memory storage locations 26 are accessed by the cache memory. This access is accomplished in a paged manner when possible. A page mode access occurs when a new main memory access is addressed to the same "page", wherein the row address bits remain the same with respect to the immediately preceding address accessed. The advantage of accessing data in this manner is that the cycle time of a page mode access is more than twice as fast as a regular memory access due primarily to the RAS precharge time being substantially longer than the CAS precharge time and the access time from RAS being substantially longer than from CAS. The page mode access thus permits data to be transferred to the PU 12 and the cache faster than the time of a normal memory access. The page mode access approach takes advantage of the spacial locality characteristic of operating progams stored in the main memories 18. The average access time to the main memories 18 will thus be reduced proportionally with the ratio between the number of page mode to normal mode accesses.

Figure 2F:
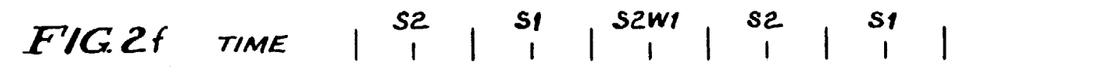
Figure 2G:
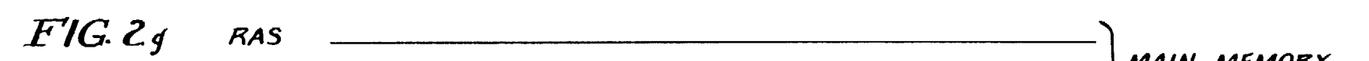
Figure 2H:
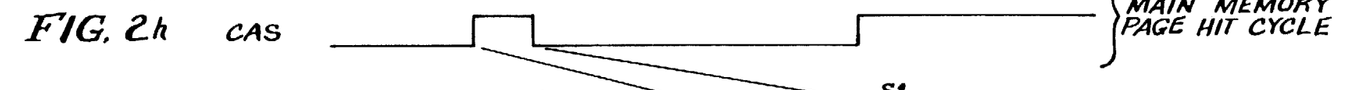
Figure 2I:
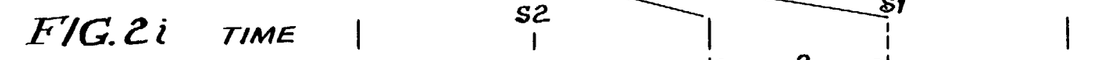

In the page mode of operation, the RAS signal remains asserted, or low, during an entire main memory access cycle as shown in FIG. 2g. The CAS signal may thus be asserted early in a memory access cycle such as in the initial time period S1 as shown in FIGS. 2f and 2h. By eliminating the requirement to assert the RAS signal within the main memory 18, the main memory access cycle may be shortened since it is only necessary to assert the CAS signal in the page mode. FIGS. 2f, 2g and 2h thus represent the timing of various signals within the improved main memory access system 10 when the required data is not stored within the cache memory 16 and the cache memory then accesses the main memories 18 and reads the required data therefrom. By permitting the RAS signal to remain active throughout the entire main memory access cycle, page mode access operation is faster than a normal main memory access since the RAS precharge time is typically on the order of 80 nanoseconds and the CAS precharge time is on the order of 15 nanoseconds. Also, for the case of the main memory page hit cycle a two-wait state memory access may turn into a one-wait state memory page hit access to permit a wait state to be eliminated. This is shown for the processor states illustrated in FIG. 2f wherein the second wait state S2W2 has been eliminated allowing for faster PU operation.

Figure 2J:
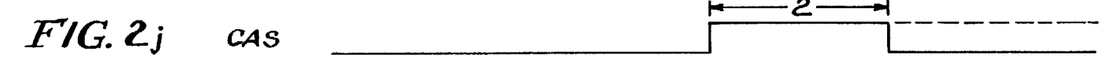
Figure 2K:
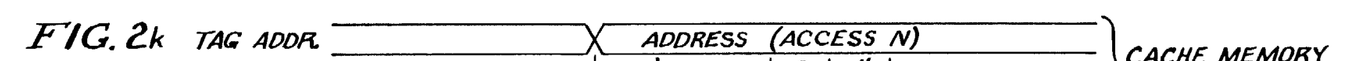
Figure 2L:
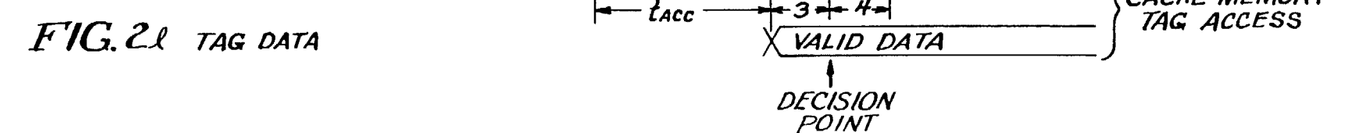

Referring to FIGS. 2i–2l, there is shown the timing of various signals within the cache memory 16 and the main memories 18. The cache memory 16 includes a plurality of static random access memories consisting of both tag RAMs 16b and data RAMs 16a. FIG. 2j illustrates an expanded CAS pulse relative to the CAS pulse shown in FIG. 2h. As shown in FIG. 2k, the tag memory access time $t_{acc}$ is initiated when the address provided from the PU 12 to the cache memory 16 via the address/data bus 20 is stable. After the address information has been provided to the cache memory 16 during the $t_{acc}$ tag RAM access time, the data read from these addresses is compared in the address comparator 16c with the required data during the time interval 3. At the end of the address comparison time 3, the cache memory 16 determines whether the required data is stored in the cache memory or must be read from the main memories 18 and provided to the cache memory. This decision point is indicated at the end of the address comparison time 3 in FIG. 2l. A comparison of FIGS. 2j and 2l illustrates that this address comparison occurs while the CAS signal is high, or inactive, during its precharge time.

If the required data is stored in the cache memory 16, the CAS signal remains high, or inactive, as shown by the dotted line portion of the CAS signal illustrated in FIG. 2j. Time interval 4 is the period during which the cache memory 16 decides whether to effect a cache hit by maintaining the CAS signal inactive following a comparison of the required data and the data stored in the cache memory during time period 3. When it is determined during the comparison time 3 that the cache memory does not contain the required data, the main memory controller during time period 4 determines to assert the CAS signal within the main memories 18 to permit the required data to be read from the main memory's matrix memory 26 and to be provided to the cache memory 16.

The cache memory 16 typically includes two RAMs 16a, 16b, with data RAM 16a storing data and tag RAM 16b storing upper address bits. The lower order address bits from the PU 12 are provided to the data RAM 16a for reading data therefrom. The upper address bits provided from the PU 12 to the cache memory's tag RAM 16b are compared with the upper address bits stored in the tag RAM. If the upper address bits provided from the PU 12 to the cache memory 16 are the same as the upper address bits stored in the tag RAM 16b, this indicates that the data in the data RAM 16a is valid and this data is then provided via the address/data bus 20 to the PU 12. If the upper address bits are not the same, the cache memory 16 initiates a read cycle from the main memories 18 to provide the required data from the main memories to the PU 12. In the latter case, the READ signal provided from the PU 12 to the cache memory 16 is converted to an appropriate RAS and/or CAS signal which is then asserted within the main memories 18 for accessing a desired location in the matrix memory therein. It is on the basis of the aforementioned address comparison that the cache memory either asserts the CAS signal within the main memories 18 (as shown by the solid line active low transition of the CAS signal in FIG. 2j), rendering one of the main memories active, or permits the CAS signal to remain inactive (high) when the required data is located in the cache memory's tag RAMs.

Figure 3A:
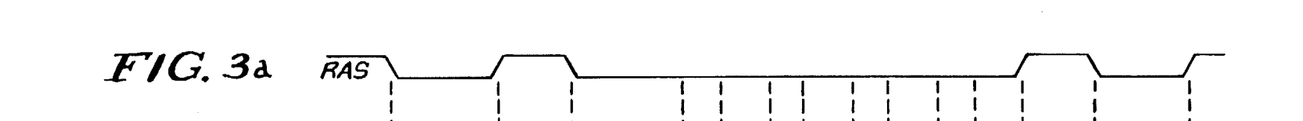
FIGS. 3a and 3b are timing diagrams of row and column address strobe signals in the improved main memory access system for use in a microprocessor system having main and cache memories of the present invention.
Figure 3B:
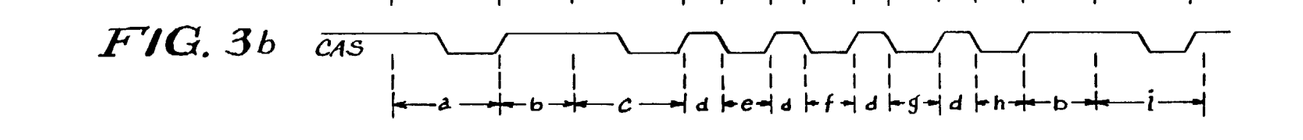

Referring to FIGS. 3a and 3b, there are respectively shown the RAS and CAS signals generated in the improved main memory access system 10 of the present invention. The time interval designated "b" represents the RAS precharge time, while the time interval "d" represents the CAS precharge time. In these timing diagrams, during time period "a" a forced page miss of the main memory occurs. A second page miss occurs during time "c". It should be noted that at the start of both the "a" and "c" time periods, the RAS signal goes active. During time intervals "e", "f", "g" and "h" the third, fourth, fifth and sixth instructions access various addresses in a paged manner. It can be seen that the RAS signal remains active during all of these access periods. Finally, a page miss occurs during time period "i" when the RAS signal goes inactive during the preceding time period "b".

Figure 4:
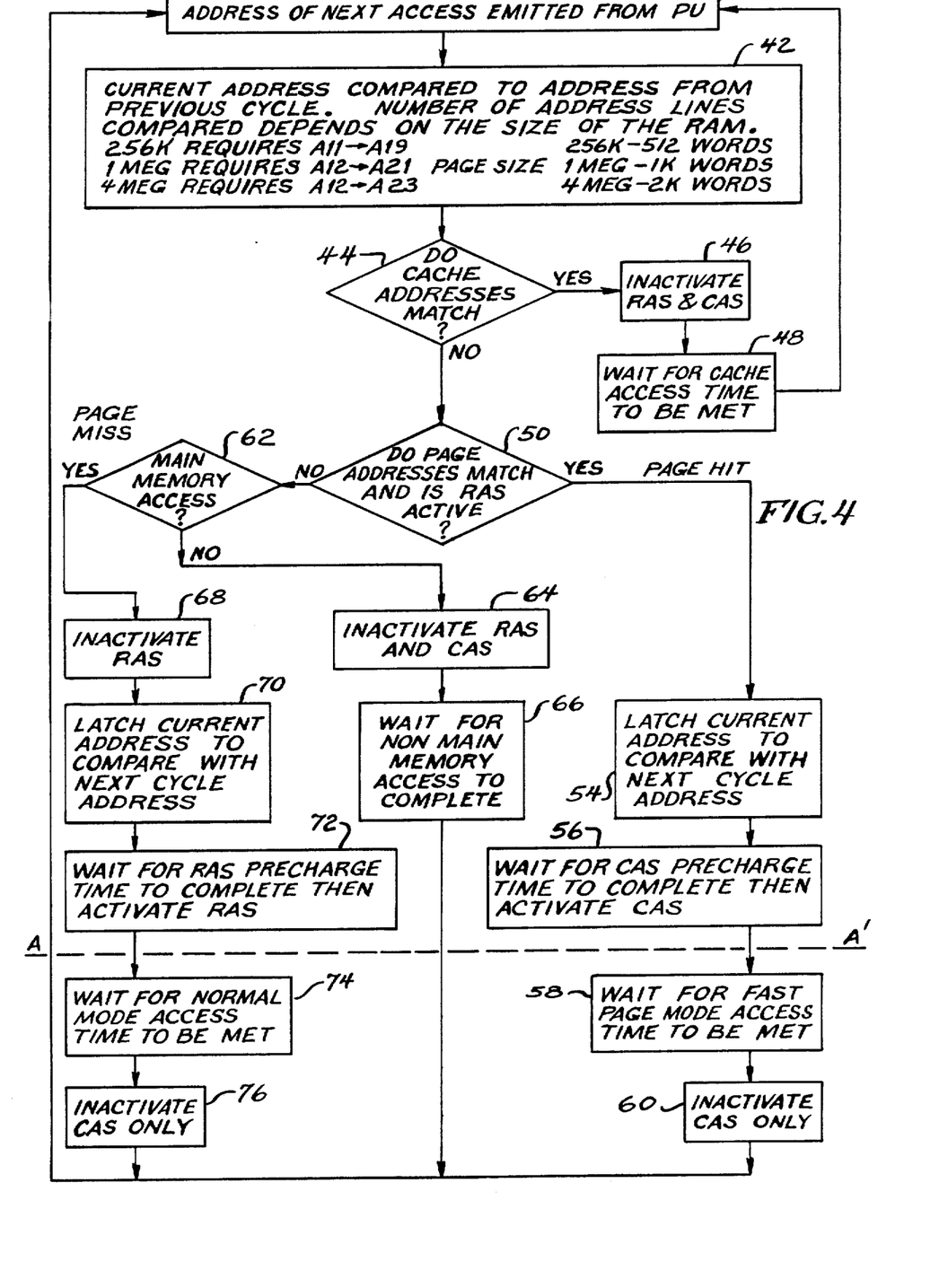
FIG. 4 is a flow chart illustrating the sequence of operations carried out in the improved main memory access system of the present invention.

Referring to FIG. 4, there is shown a flow chart of the operations carried out in the improved main memory access system 10 of the present invention. The sequence of operations illustrated in FIG. 4 is carried out by the cache memory controller 17 and the main memory controller 19. The cache and main memory controllers 17, 19 are each comprised of a pair of coupled programmable array logic circuits (PALs) which are programmed to carry out the sequence of operations discussed in detail in the following paragraphs. In a preferred embodiment, the cache memory controller 17 is comprised of the combination of a PAL 16L8 and a PAL 16R8, while the main memory controller 19 is comprised of the combination of a PAL 22V10 and a PAL 16R4. Each of the aforementioned PALS are commercially available and are programmed in a conventional manner in carrying out the sequence of operations described below.

The operation of the improved main memory access system 10 in carrying out the present invention is initiated at block 40 upon the providing of the address of the next memory access from the PU 12 to the cache and main memories 16, 18. The next step in the operation at step 42 involves the comparison of the current address emitted from the PU 12 at step 40 with the memory address accessed in the previous cycle. The number of address lines compared depends upon the size of the RAM being used. For example, a 256K RAM requires the comparison of 9 address bits, e.g., A11 to A19 in one embodiment. A larger RAM such as a 4 MEG RAM requires the comparison of 11 address bits, e.g., A12 to A23. Address comparisons are made in the cache memory 16 by means of its address comparator 16c and in the main memories 18 by means of the main memory address comparator 23. The address from the preceding cycle is stored in the cache memory's tag RAM 16b as well as in the main memories' previous cycle address latch 21. The comparison between current and previous addresses is performed in a conventional manner by each of the aforesaid address comparators.

Following comparison of the previous and current addresses, a determination is made by the cache memory's address comparator 16c and controller 17 as to whether the previous and current cache memory addresses match at step 44. If the previous and current cache memory addresses match, operation branches to step 46 for initiating a cache memory access by first inactivating the RAS and CAS signals at step 46. This is shown following time intervals a and h in FIGS. 3a and 3b. FIGS. 2g–2l illustrate the timing of various signals in the main memory access system in the case of a cache memory access as previously described. Following inactivation of the RAS and CAS signals in initiating a cache memory access cycle, the system waits for the cache memory access time to run at step 48, followed by a return to step 40 where the memory controllers await receipt of the next memory address to be accessed.

If at step 44 it is determined that the previous and current cache memory addresses do not match, system operation branches to step 50 to determine if the main memory page addresses match and if the RAS signal is active. If at step 50 it is determined that the main memory page addresses match *and* that the RAS signal is active, this corresponds to accessing of the main memories 18 in a paged manner as previously described. Operation of the system then proceeds to step 54 where the current main memory address is latched into the previous cycle address latch 21 for subsequent comparison with the next cycle address. After the maim memory address is latched into the previous cycle address latch 21, operation of the system waits for the CAS precharge time to be completed and then activates the CAS signal at step 56. Completion of the CAS precharge time and activation of the CAS signal is illustrated at the end of time interval d in FIG. 3b. The main memories 18 are thus accessed during the CAS precharge time in the paged mode of operation. The system then waits for the fast page mode access time to expire at step 58, which corresponds to either time interval e or h in FIG. 3b, and then inactivates the CAS signal at step 60 before returning to step 40 to await receipt of the next memory address to be accessed from the PU 12. Inactivation of the CAS signal following the passage of a fast page mode access time interval reprsented by time interval e is shown following this period as time interval d in FIG. 3b. Thus, the series of operations illustrated in the right hand branch of the flow chart of FIG. 4 represents high speed page mode accessing of the main memories 18 by the PU 12, wherein the RAS remains active throughout the operating cycle and the CAS goes inactive following PU accessing of the main memories 18.

If at step 50 it is determined that either the page addresses do not match *or* that the RAS signal is not active, system operation branches to step 62 for determining if the main memories 18 are to be accessed. The main memory controller 19 determines whether the main memories 18 are to be accessed by monitoring various status signals from the PU 12 which provide an indication that the PU seeks to access the main memories. If at step 62, the main memories' controller 19 determines that the main memories are not to be accessed, system operation proceeds to step 64 for inactivating the RAS and CAS signals such as after time interval h in FIG. 3b. The PU 12 may seek to access the I/O devices 15 or a video display device (not shown) in which case neither the cache memory 16 nor the main memories 18 will be accessed by the PU. Following inactivation of the RAS and CAS signals at step 64, the system then waits for a non-main memory access to be completed at step 66, followed by a return to step 40 to await receipt of the next memory address to be accessed from the PU 12.

If at step 62 it is determined that the main memories 18 are to be accessed, operation of the system proceeds to step 68 for inactivating the RAS signal such as illustrated at the end of time interval h in FIG. 3b. Following inactivation of the RAS signal, the current main memory address to be accessed is latched into previous cycle address latch 20 for subsequent comparison with the next cycle main memory address to be accessed at step 70. The system then waits for the RAS precharge time to be completed at step 72, followed then by activation of the RAS signal such as illustrated at the end of time interval b in FIG. 3a. The main memories 18 are thus accessed after the RAS precharge time in the non-paged mode of operation. Following step 72, the system then waits for expiration of a main memory normal mode (unpaged) access time before proceeding to step 76 and inactivating the CAS signal. A main memory normal mode access time is illustrated in FIG. 3b as either time intervals c or i followed by inactivation of the CAS signal as illustrated in time intervals d of FIG. 3b. After inactivation of the CAS signal at step 76, operation of the system returns to step 40 to await receipt from the PU 12 by the cache and main memories 16, 18 of the next memory address to be accessed.

It is to be noted here that all of the operations represented by the various aforementioned numbered steps above the dotted line A—A' in FIG. 4 are carried out during either the CAS or RAS precharge times. Thus, if the cache memory 16 is to be accessed by the PU 12, the RAS and CAS signals are inactivated at step 46 and direct access of the PU to the cache memory is provided immediately. On the other hand, if the PU 12 desires access to the main memories 18, in the paged mode of operation as shown in the right hand portion of FIG. 4, with the RAS signal continuously asserted, the cache memory tag RAM access is accomplished during the CAS precharge time of the main memories. For the case of non-paged access of the main memories 18 by the PU 12, the cache memory tag RAM access is accomplished during the RAS precharge time as shown in the left hand portion of FIG. 4. In either case, whether the PU 12 accesses the main memories 18 in a paged or a non-paged manner, PU access to the cache tag memories is provided during a precharge time of the main memories and after a cache memory check has determined a miss. The PU access to main memory then begins at the same time whether or not a cache memory is installed.

There has thus been shown a method and apparatus for providing improved access to a main memory in a microprocessor system having a cache memory. Access to both the cache and main memories is provided to the system's processor unit at the same time. If cache memory access is required, the processor unit accesses the high speed cache memory. Access to the cache tag memories is provided during a precharge time of the main memories such that if cache memory access is a miss, the processor unit can immediately access the main memories without loss of time. This arrangement reduces main memory access times and increases data processing system speed and throughput.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. In a data processing system having a processing unit for reading and processing desired data either from a fast cache memory wherein first data most frequently processed by said processing unit is stored or from a slower main memory wherein second data less frequently processed by said processing unit than said first data is stored, and wherein either said cache memory or said main memory is accessed by said processing unit during a plurality of successive system operating cycles, a method of accessing said main memory comprising:
   initiating access of said main memory by asserting a precharging signal to said main memory over a predetermined time interval in preparation for accessing said main memory;
   accessing said cache memory during said predetermined time interval; and
   accessing said main memory following said predetermined time interval when said cache memory does not have the desired data and reading the desired data from said main memory.

2. The method of claim 1 wherein operation of said main memory stabilizes during said predetermined time interval.

3. The method of claim 1 wherein said main memory includes a plurality of matrix memories, said method further comprising the step of accessing said main memory in a paged manner when the desired data for successive system operating cycles is in only one of the matrix memories.

4. The method of claim 1 further comprising the step of de-asserting said precharging signal following accessing of either said cache memory or said main memory by said processing unit.

5. The method of claim 1 further comprising the step of determining whether the desired data is in said cache memory or said main memory by comparing a desired data address from said processing unit with addresses of data storage locations in said cache memory and in said main memory.

6. The method of claim 5 wherein the step of comparing a desired data address from said processing unit with addresses of data storage locations in said cache memory and in said main memory includes comparing a desired data address from said processing unit with the address of the data storage location in said main memory accessed in the previous system operating cycle.

7. The method of claim 6 wherein the step of comparing a desired data address from said processing unit with the address of the data storage location in said main memory accessed in the previous system operating cycle includes storing the address of the data storage location in said main memory accessed in the previous system operating cycle in a latch for subsequent recall and comparison with the desired data address.

8. In a data processing system having a processing unit for reading and processing desired data either from a fast cache memory wherein first data most frequently processed by said processing unit is stored or from a slower main memory including a plurality of matrix memories wherein second data less frequently processed by said processing unit than said first data is stored, and wherein either said cache memory or said main memory is accessed by said processing unit during a plurality of successive system operating cycles, a method of accessing said main memory comprising:
   initiating access of said main memory by asserting a precharging signal to said main memory over a predetermined time interval in preparation for accessing said main memory;
   accessing said cache memory during said predetermined time interval;
   accessing said main memory following said predetermined time interval when said cache memory does not have the desired data and reading the desired data from said main memory;
   accessing said main memory in a paged manner when the desired data for successive system operating cycles is in only one of the matrix memories; and
   providing each of said matrix memories with a plurality of addressable memory locations arranged in a matrix array and defining each of said addressable memory locations by a given row and column and providing said precharging signal as a Column Address Strobe (CAS) signal.

9. The method of claim 8 further comprising the step of continuously asserting a Row Address Strobe (RAS) signal.

10. In a data processing system having a processing unit for reading and processing desired data either from a fast cache memory wherein first data most frequently processed by said processing unit is stored or from a slower main memory wherein second data less frequently processed by said processing unit than said first data is stored, and wherein either said cache memory or said main memory is accessed by said processing unit during a plurality of successive system operating cycles, a method of accessing said main memory comprising:
   initiating access of said main memory by asserting a precharging signal to said main memory over a predetermined time interval in preparation for accessing said main memory;

accessing said cache memory during said predetermined time interval;

accessing said main memory in a paged manner following said predetermined time interval when said cache memory does not have the desired data and reading the desired data from said main memory; and providing said main memory with a plurality of matrix memories each having a plurality of addressable memory locations arranged in a matrix array and defining each of said addressable memory locations by a given row and column and providing said precharging signal as a Row Address Strobe (RAS) signal when said matrix memories are accessed in a non-paged manner.

* * * * *